(12) United States Patent
Iizuka

(10) Patent No.: US 8,982,191 B2
(45) Date of Patent: Mar. 17, 2015

(54) DIVERGENCE RATIO DISTANCE MAPPING CAMERA

(76) Inventor: Keigo Iizuka, Don Mills (CA)

( * ) Notice: Subject to any disclaimer, the term of this patent is extended or adjusted under 35 U.S.C. 154(b) by 1328 days.

(21) Appl. No.: 12/532,644

(22) PCT Filed: Mar. 3, 2008

(86) PCT No.: PCT/CA2008/000502
§ 371 (c)(1),
(2), (4) Date: Sep. 23, 2009

(87) PCT Pub. No.: WO2008/116288
PCT Pub. Date: Oct. 2, 2008

(65) Prior Publication Data

US 2010/0110165 A1    May 6, 2010
US 2015/0009300 A9    Jan. 8, 2015

Related U.S. Application Data

(63) Continuation-in-part of application No. 11/690,503, filed on Mar. 23, 2007, now abandoned.

(51) Int. Cl.
| | |
|---|---|
| *H04N 13/02* | (2006.01) |
| *G01C 3/08* | (2006.01) |
| *G01B 11/24* | (2006.01) |
| *G01B 11/14* | (2006.01) |
| *G06K 9/00* | (2006.01) |
| *G06T 7/00* | (2006.01) |
| *G01S 17/08* | (2006.01) |
| *G01S 17/89* | (2006.01) |

(52) U.S. Cl.
CPC ............... *G06T 7/0022* (2013.01); *G01S 17/08* (2013.01); *G01S 17/89* (2013.01); *H04N 13/0207* (2013.01); *H04N 13/0253* (2013.01); *G06T 7/0073* (2013.01); *G06T 2207/10016* (2013.01)

USPC ............. 348/50; 348/578; 356/3.01; 356/3.1; 356/4.01; 356/4.1; 356/613; 356/614; 382/106; 382/107; 382/154

(58) Field of Classification Search
None
See application file for complete search history.

(56) References Cited

U.S. PATENT DOCUMENTS

| | | | | |
|---|---|---|---|---|
| 4,425,501 A | * | 1/1984 | Stauffer | 250/216 |
| 4,720,723 A | * | 1/1988 | Harunari et al. | 396/106 |
| 4,740,806 A | * | 4/1988 | Takehana | 396/123 |

(Continued)

OTHER PUBLICATIONS

Keigo Iizuka, Divergence-ratio axi-vision camera (Divcam): A distance mapping camera, Review of Scientific Instruments 77, 045111, Apr. 13, 2006.

*Primary Examiner* — Ario Etienne
*Assistant Examiner* — Ho Shiu
(74) *Attorney, Agent, or Firm* — Norton Rose Fulbright Canada LLP

(57) ABSTRACT

The present invention relates to a method and system for detecting and mapping three-dimensional information pertaining to one or more target objects. More particularly, the invention consists of selecting one or more target objects, illuminating the one or more target objects using a first light source and capturing an image of the one or more target objects, then, illuminating the same one or more target objects using a second light source and capturing an image of the one or more target objects and lastly calculating the distance at the midpoint between the two light sources and the one or more target objects based on the decay of intensities of light over distance by analyzing the ratio of the image intensities on a pixel by pixel basis.

21 Claims, 8 Drawing Sheets

(56) References Cited

U.S. PATENT DOCUMENTS

| | | | | |
|---|---|---|---|---|
| 4,843,565 | A * | 6/1989 | Rose | 701/301 |
| 4,983,033 | A * | 1/1991 | Suzuki | 356/3.01 |
| 5,003,166 | A * | 3/1991 | Girod | 250/201.4 |
| 5,706,417 | A * | 1/1998 | Adelson | 345/640 |
| 6,057,909 | A | 5/2000 | Yahav et al. | |
| 6,215,898 | B1 * | 4/2001 | Woodfill et al. | 382/154 |
| 6,266,053 | B1 * | 7/2001 | French et al. | 715/255 |
| 6,554,452 | B1 * | 4/2003 | Bourn et al. | 362/247 |
| 6,587,183 | B1 * | 7/2003 | Morimura et al. | 356/3.1 |
| 6,700,669 | B1 * | 3/2004 | Geng | 356/603 |
| 6,734,951 | B2 * | 5/2004 | Uomori et al. | 356/3.1 |
| 7,016,519 | B1 | 3/2006 | Nakamura et al. | |
| 7,058,213 | B2 | 6/2006 | Rubbert et al. | |
| 7,123,351 | B1 * | 10/2006 | Schaefer | 356/4.07 |
| 7,221,437 | B1 * | 5/2007 | Schaefer | 356/4.07 |
| 7,224,384 | B1 * | 5/2007 | Iddan et al. | 348/207.99 |
| 7,361,472 | B2 | 4/2008 | Yguerabide et al. | |
| 7,379,584 | B2 | 5/2008 | Rubbert et al. | |
| 2001/0038750 | A1 * | 11/2001 | Kindaichi | 396/96 |
| 2002/0032697 | A1 * | 3/2002 | French et al. | 707/500.1 |
| 2002/0067355 | A1 * | 6/2002 | Randel | 345/426 |
| 2002/0067474 | A1 * | 6/2002 | Uomori et al. | 356/3.01 |
| 2002/0130961 | A1 * | 9/2002 | Lee et al. | 348/333.03 |
| 2002/0135468 | A1 * | 9/2002 | Bos et al. | 340/436 |
| 2002/0158872 | A1 * | 10/2002 | Randel | 345/426 |
| 2003/0046177 | A1 * | 3/2003 | Winchester et al. | 705/26 |
| 2003/0193659 | A1 * | 10/2003 | Uomori et al. | 356/3.1 |
| 2003/0202120 | A1 * | 10/2003 | Mack | 348/578 |
| 2004/0041997 | A1 * | 3/2004 | Uomori et al. | 356/3.01 |
| 2004/0145722 | A1 * | 7/2004 | Uomori et al. | 356/4.01 |
| 2004/0165196 | A1 * | 8/2004 | Ono | 356/614 |
| 2005/0062739 | A1 * | 3/2005 | Balmelli et al. | 345/426 |
| 2005/0267657 | A1 * | 12/2005 | Devdhar | 701/35 |
| 2005/0278098 | A1 * | 12/2005 | Breed | 701/45 |
| 2006/0171566 | A1 * | 8/2006 | Gindele et al. | 382/106 |
| 2008/0037829 | A1 * | 2/2008 | Givon | 382/107 |
| 2011/0119013 | A1 * | 5/2011 | Onea et al. | 702/96 |

* cited by examiner

DIVERGENCE RATIO DISTANCE MAPPING CAMERA

This application claims the benefit of U.S. patent application Ser. No. 11/690,503, filed Mar. 23, 2007.

FIELD OF THE INVENTION

The present invention relates to a method and system for detecting and mapping three-dimensional information pertaining to an object. In particular, the invention relates to a method and system that makes use of the divergence of light over distance as a means of determining distance.

BACKGROUND OF THE INVENTION

Distance mapping or depth mapping cameras have become ubiquitous in numerous fields such as robotics, machine vision for acquiring three-dimensional (3D) information about objects, intelligent transport systems for assisting driver safety and navigation, bioscience for detecting 3D laparoscopic images of internal organs, non-contact fingerprinting, and image manipulation in movie or television studios.

To achieve the goal of distance mapping an object in order to acquire its 3D information, numerous methods have been developed. The triangulation method uses two or more images taken by strategically placed cameras to calculate the position of the target object. The 3D information is obtained by synchronizing the movement of the light projection spot with the direction of the return path of the light scattered to the detector. This triangulation method is limited in that it is too slow and generally can not provide for the real-time operation of a television camera.

The time of flight method makes use of the time required for a round trip of a laser beam using a phase or frequency modulated probe light. A heterodyne detection converts the phase or frequency information into the distance to the target object. While depth resolution can be within micrometers, time of flight methods can be limited to the order of minutes in providing a depth map of a target object.

Projection methods determine depth information from the patterns of configured light projected onto a target object. The best known projection method is the moiré technique. The moiré technique incorporates two grid patterns projected before and after the surface distortion to generate a moiré pattern of the deformed surface. While a moiré pattern can be readily generated, not so are the corresponding distance calculations. This distance is calculated in a manner similar to applying triangulation at every intersection of the pattern.

The AXI-VISION CAMERA™ method as described in U.S. Pat. No. 7,0165,519 B1 is based on a hybrid of the projection and time of flight methods. The projecting light is temporally rather than spatially modulated. To acquire the depth pattern, an instantaneous time of flight pattern is captured using an ultra-fast shutter. Distance is then calculated at every pixel providing a picture quality to that of High Definition Television (HDTV). To achieve its results, the AXI-VISION CAMERA™ method requires a large number of fast response time LEDs, a photomultiplier based shutter that are all secured to the AXI-VISION CAMERA™.

The object of the present invention is to provide a method and device for detecting and mapping three-dimensional information pertaining to one or more target objects while further addressing the limitations of the prior art.

SUMMARY OF THE INVENTION

A method of obtaining three-dimensional information for one or more target objects is provided, characterized in that it comprises the steps of: (a) selecting one or more target objects; (b) illuminating the one or more target objects using a first light source at a distance $X_1$ from the one or more target objects, and capturing an image $I_1$ of the one or more target objects using at least one camera device; (c) illuminating the one or more target objects using a second light source at a distance $X_2$ from the one or more target objects, and capturing an image $I_2$ of the one or more target objects using the at least one camera device; and (d) calculating the distance X between the first and second light sources, and the one or more target objects, based on the decay of intensities of light sources over distances $X_1$ and $X_2$, using the ratio of the image intensities between the images $I_1$ and $I_2$.

In another aspect of the invention a system for obtaining three-dimensional information for one or more target objects is provided characterized in that it comprises: (a) at least two light sources, including a first light source at a distance $X_1$ from one or more target objects, and a second light source at a distance $X_2$ from the one or more target objects; and (b) at least one camera device linked to, or incorporating, at least one computer device, the camera device, or the camera device and computer device together, being operable to: (i) capture and store digital frame information, including capturing an image $I_1$ of the one or more target objects, illuminated by the first light source, and an image $I_2$ of the same one or more target objects, illuminated by the second light source; and (ii) calculate the distance X between the at least two light sources and the one or more target objects based on the ratio of the decay of image intensities of light sources over distances $X_1$ and $X_2$ using the ratio of the image intensities between the images $I_1$ and $I_2$.

BRIEF DESCRIPTION OF THE DRAWINGS

A detailed description of the preferred embodiment(s) is(are) provided herein below by way of example only and with reference to the following drawings, in which.

Figure 1A:
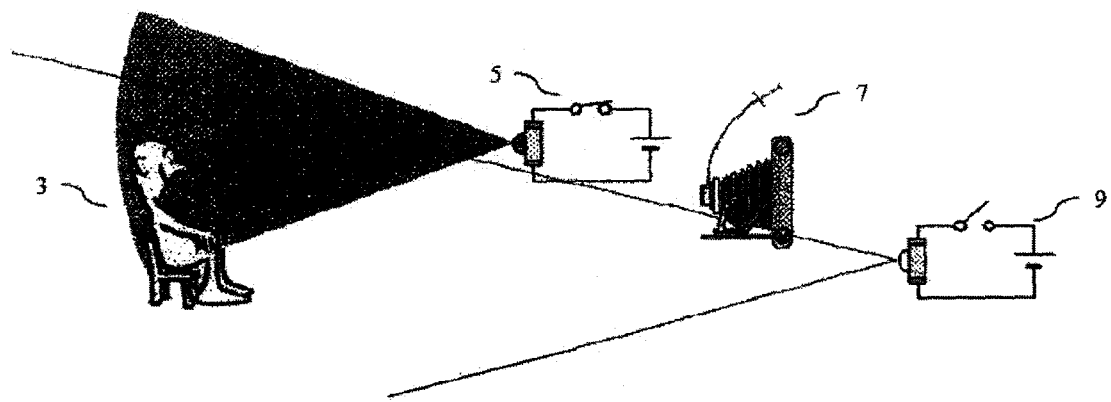
FIG. 1a illustrates the distance mapping apparatus capturing an image $I_1$ of a target object using the first illuminating device as a light source.

In the drawings, preferred embodiments of the invention are illustrated by way of example. It is to be expressly understood that the description and drawings are only for the purpose of illustration and as an aid to understanding, and are not intended as a definition of the limits of the invention. It will be appreciated by those skilled in the art that other variations of the preferred embodiment may also be practised without departing from the scope of the invention.

DETAILED DESCRIPTION OF THE INVENTION

FIG. 1a illustrates the distance mapping apparatus 1 capturing an image $I_1$ of a target object 3 using a first illuminating device 5 as a light source. The first illuminating device 5 illuminates the target object 3 and the camera device 7 captures an image $I_1$ that is stored by the system on a storage medium (see FIG. 6).

Figure 1B:
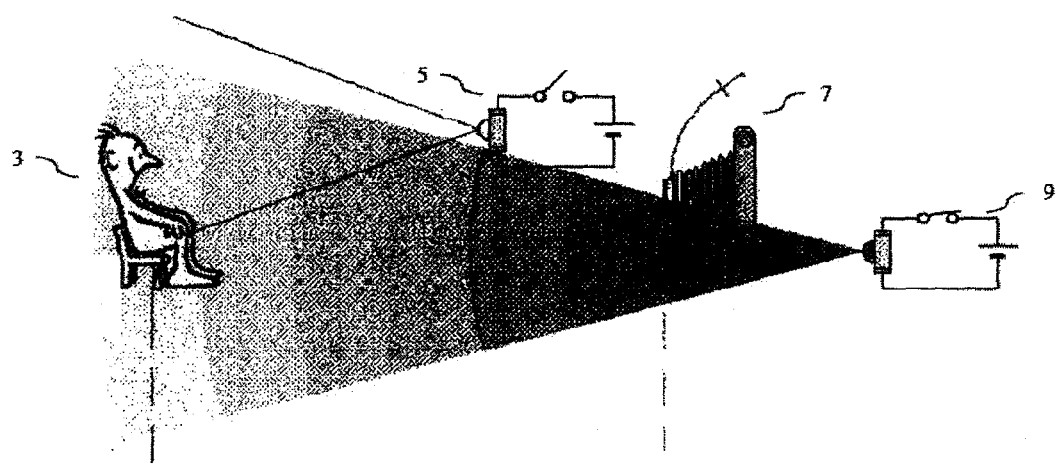
FIG. 1b illustrates the distance mapping apparatus capturing an image $I_2$ of a target object using the second illuminating device as a light source.

FIG. 1b illustrates the distance mapping apparatus 1 capturing an image $I_2$ of a target object 3 using a second illuminating device 9 as a light source. The second illuminating device 9 illuminates the target object 3 and the camera device 7 captures an image $I_2$ that is stored by the system on a storage medium (see FIG. 6).

Figure 1C:
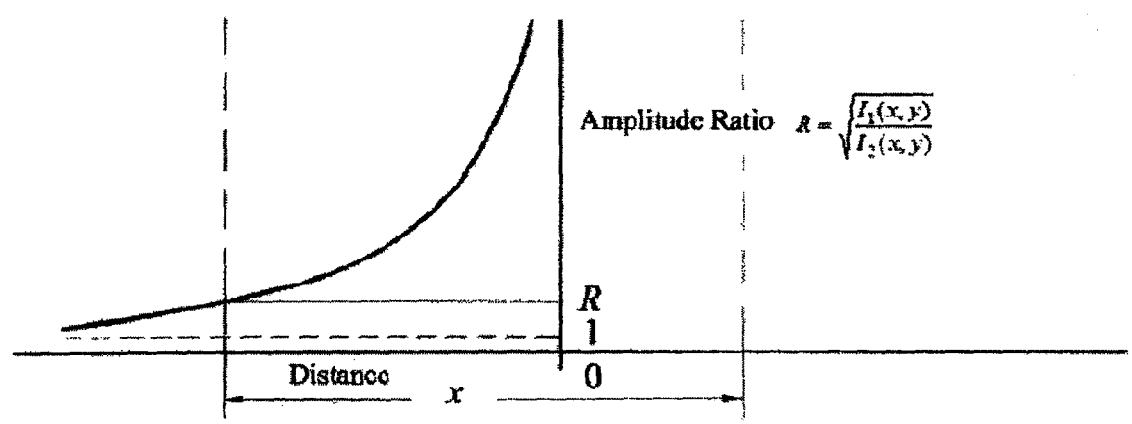
FIG. 1c illustrates the amplitude ratio between $I_1$ and $I_2$.

FIG. 1c illustrates the amplitude ratio between $I_1$ and $I_2$. As further explained (see FIG. 2), through the derivation of the equation to calculate distance, the present invention functions by comparing the relative image intensities between $I_1$ and $I_2$ on a pixel by pixel basis. FIG. 1c demonstrates a graph wherein the relative image intensities between $I_1$ and $I_2$ have been plotted providing the amplitude ratio.

Figure 2:
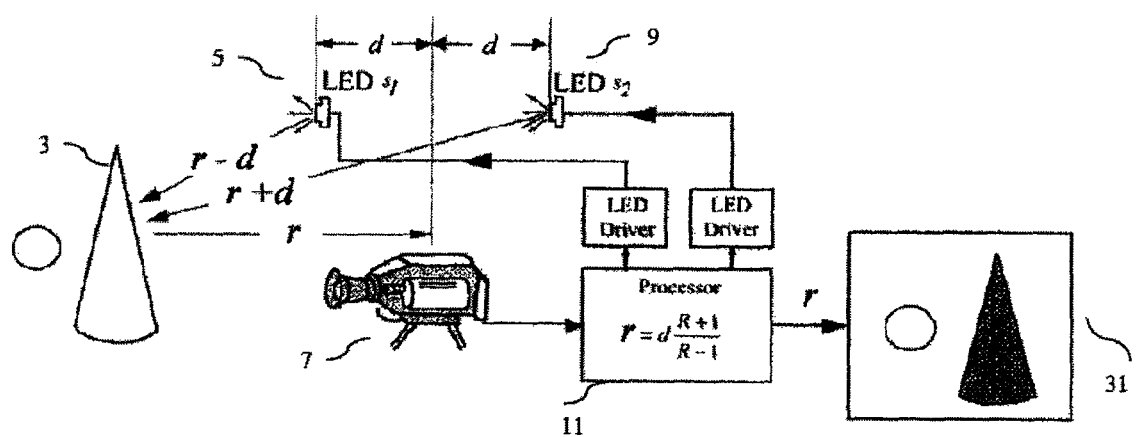
FIG. 2 further illustrates the geometry of the divergence ratio distance mapping camera.

FIG. 2 further illustrates the geometry of a divergence ratio distance mapping camera apparatus, in accordance with one aspect of the present invention. The apparatus is set up in the following manner: a camera device 7 is at a distance r from the target object 3, a first illuminating device 5 labelled LED $s_1$ is at a distance $X_1$ (r−d) from the target object 3, and a second illuminating device 9 labelled LED $s_2$ is at a distance $X_2$ (r+d) from the target object 3. The camera device 7 is also linked to, or incorporates, a computer device, such as a processor 11 which is operable to compute the distance to the target object 3 from the relative image intensities of $I_1$ and $I_2$. As mentioned, the camera device 7 firstly captures an image $I_1$ of the target object 3 using the first illuminating device 5 LED $s_1$ as a light source. This image $I_1$ is stored by a storage medium, such as a frame grabber 21 (see FIG. 6) of processor 11 (the frame grabber 21 being hardwired to processor 11 or incorporated into computer programming made accessible to processor 11). The camera device 7 then captures an image $I_2$ of the target object 3 using the second illuminating device 9 LED $s_2$ as a light source. This image $I_2$ is also stored by the storage medium, such as the frame grabber 21 of the processor 11.

In order to calculate the distance to the target object 3, the processor 11 is operable to compare the relative image intensities of $I_1$ and $I_2$ on a pixel by pixel basis. Before this comparison can be performed, the processor 11 calculates the image intensity of $I_1$ using the first illuminating device 5 LED $s_1$ as a light source as well as calculating the image intensity of $I_2$ using the second illuminating device 9 LED $s_2$ as a light source. The calculated pixel distance information is stored to the storage medium.

The image intensity calculation is further utilized to calculate a distance X between the first and second light sources. In one embodiment of the present invention, X is calculated based on the distance between the one or more target objects and the midpoint of the first and second light sources. In another embodiment of the present invention, X may be specifically calculated based on the decay of light intensity over distances $X_1$ and $X_2$, using the ratio of the image intensities between the images $I_1$ and $I_2$. The decay of light intensity over distance X is $1/x^n$, where n can be either a positive or negative real number including a non-integer.

In one embodiment of the present invention, the first image $I_1$ and the second image $I_2$ are stored on a storage medium known by individuals skilled in the art; the distance X at the midpoint between the two light sources and the one or more target objects is calculated by analyzing images $I_1$ and $I_2$ on a pixel by pixel basis; the calculated pixel distance information is stored using a known coordinate storage medium.

In one embodiment of the present invention, the pair of light sources 5, 9 that are used are infra red point light sources. It is commonly known to those skilled in the art that intensity of a point light source decays with the square of the distance due to the divergence property of light. Therefore the intensity of the light from the illuminating device 5 LED $s_1$ directed at the target object 3 located at a distance r from the camera device 7 is:

$$I_{in} = \frac{P_0}{4\pi(r-d)^2} \quad (1)$$

where $P_0$ is the power of the point source from first light source 5 LED $s_1$. In addition, the target object 3 reflects light back towards the camera device 7. The amount of the reflection is characterized by the radar term of back scattering cross section σ. The light power associated with the back scattering toward the camera device 7 is:

$$P_{sc} = \frac{\sigma P_0}{4\pi(r-d)^2} \quad (2)$$

Since the reflected light that is propagating back to the camera device 7 also obeys the divergence property, the intensity of the reflected light decays with the square of the distance resulting in the following light intensity equation for $I_1$:

$$I_1 = \frac{\sigma P_0}{[4\pi(r-d)]^2 r^2} \quad (3)$$

In a similar manner the light intensity equation for the image $I_2$ of the target object 3 using the second illuminating device 9 LED $s_2$ as a light source is derived, by simply replacing r−d by r+d in Eq. (3) in the following manner:

$$I_2 = \frac{\sigma P_0}{[4\pi(r+d)]^2 r^2} \quad (4)$$

As one can clearly see, Eqs. (3) and (4) share a number of common factors and by importing these two equations in the amplitude ratio R equation:

$$R = \sqrt{(I_1/I_2)} \quad (5)$$

Results in the following reduced equation for amplitude ratio R:

$$R = (r+d)/(r-d) \quad (6)$$

Rearranging Eq. (6) to solve for the value of interest r, that being the distance between the camera device 7 and the target object 3 results in the following equation:

$$r = d(R+1)/(R-1) \quad (7)$$

Of special note, such factors as the back scattering cross section σ of the target object 3, point source light power $P_0$ (assuming that both point sources: first light source 5 LED $s_1$ and second light source 9 LED $s_2$ have equivalent power), and the divergence $r^{-2}$ of the return light reflected from the target object 3 towards the camera device 7 all of which appear in both Eqs. (3), and (4) are cancelled out from the calculation and accurate distance is measured regardless of the target object colour and texture.

Using the derived equation for distance Eq. (7), the processor 11, then determines the distance of each pixel on a pixel by pixel basis and is operable to store the information in a coordinate storage medium as a distance map for the target object 3 in a manner that is known to those skilled in the art. This distance map for the target object 3, contains all of the pixel positional information of the target object 3.

Figure 3:
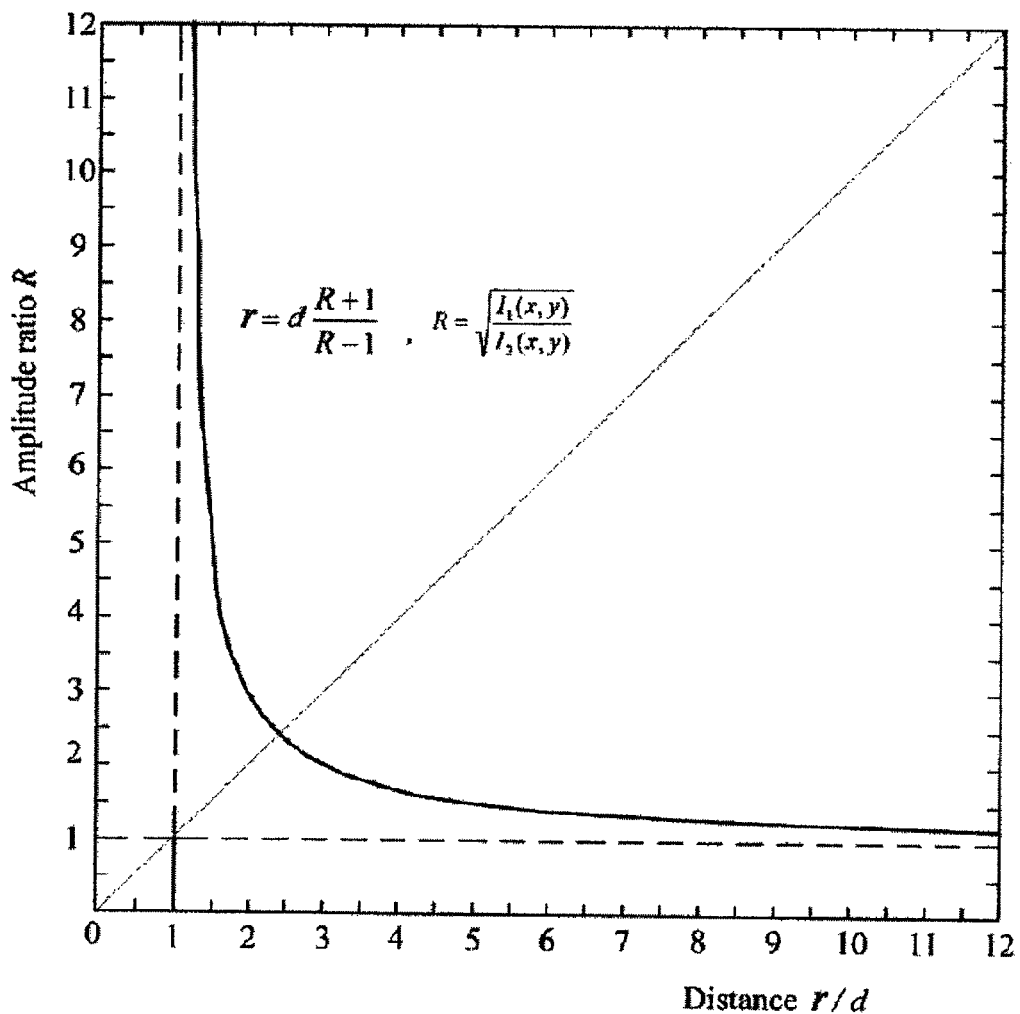
FIG. 3 is a graph that illustrates the relationship between amplitude ratio R and the distance r/d.

FIG. 3 is a plot that illustrates the relationship between amplitude ratio R and the distance r/d. The sensitivity of the measurement is optimum near the origin and reduces as the asymptote is approached. It is also interesting to note that the Eq. (7) can be rewritten in the following manner:

$$\left(\frac{x}{d} - 1\right)(R - 1) = 2 \quad (8)$$

and the exchange of coordinates between x/d and R gives the same curve shape. As shown by FIG. 3, the curve is symmetric with respect to a 45 degree line, and there is the same asymptote of unity in both the R and the r/d axes.

Figure 4:
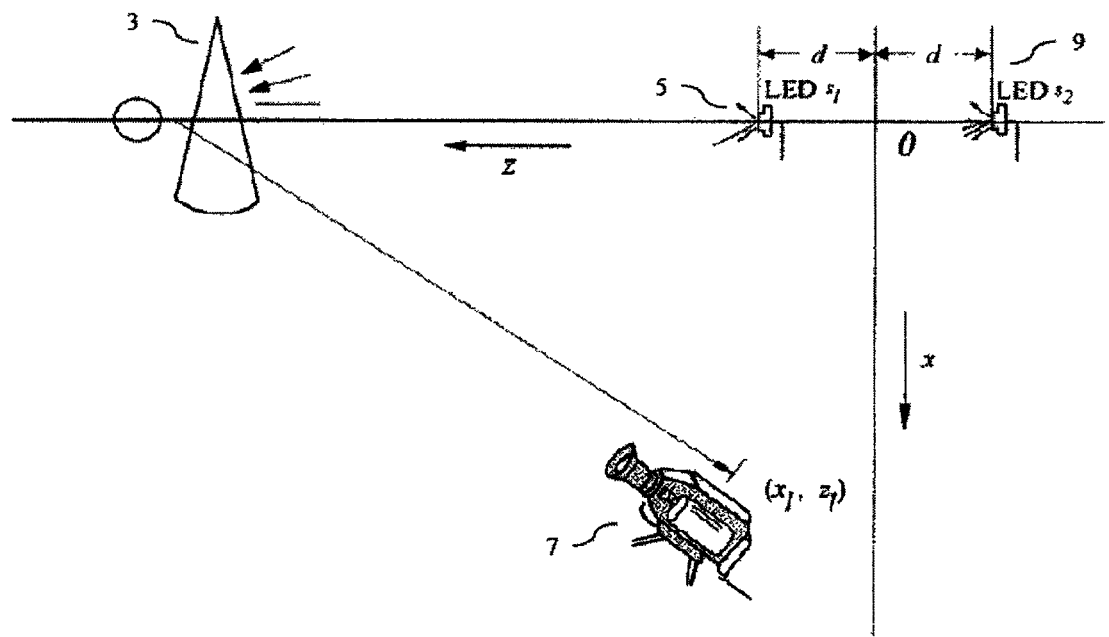
FIG. 4 illustrates the ability to move the divergence ratio distance mapping camera to an arbitrary location.

FIG. 4 illustrates the ability to move the divergence ratio distance mapping camera or camera device 7 to an arbitrary location. For ease of equation derivation, the ratio distance mapping camera apparatus was previously described with the camera device 7 in-line with the two illuminating devices: first light source 5 LED $s_1$ and second light source 9 LED $s_2$. As indicated by FIG. 4 and as will be demonstrated by the following equation derivation, the camera device 7 may be placed in an arbitrary location and the actual distance that is being measured is between the target object 3 and the center of the two illuminating devices (first light source 5 LED $s_1$ and second light source 9 LED $s_2$). As depicted in FIG. 4, the position of the camera device 7 has been relocated from the center of the two illuminating devices (first light source 5 LED $s_1$ and second light source 9 LED $s_2$) to an arbitrary location $(x_1, z_1)$ in the x-z plane. Taking the origin (0,0) of this coordinate system to be the center of the light point sources, the target object 3 is located along the z-axis at coordinate (0,z). The separation between the two light point sources (first light source 5 LED $s_1$ and second light source 9 LED $s_2$) is kept constant at 2d as before.

Incorporating this information from the new coordinate system into Eqs. (3) and (4) results in the following equations:

$$I_1 = \frac{\sigma P_0}{[4\pi(z-d)]^2 [(x-x_1)^2 + z_1^2]} \quad (9)$$

$$I_2 = \frac{\sigma P_0}{[4\pi(z+d)]^2 [(x-x_1)^2 + z_1^2]} \quad (10)$$

Solving for the amplitude ratio R using Eqs. (9) and (10) results in the following equation:

$$r = d(R+1)/(R-1) \quad (11)$$

which is identical to the previously derived Eq. (7).

It is interesting to note that the distance measured is always along this z axis between target object 3 and the center of the two illuminating devices (first light source 5 LED $s_1$ and second light source 9 LED $s_2$). This ability to position the camera independent of the orientation of the light sources provides considerable operational advantage that could be readily incorporated into different embodiments and arrangements of the present invention. For example if the LED's are installed either on the studio ceiling or wall, the hand-held camera does not have to bear an additional weight or attachment.

It should be noted that as a caveat, it is discouraged that the camera stray too far off the connecting line between the two points sources because shadows may be created in the mapped image. A countermeasure to assist in reducing shadows in the mapped image is described below (FIG. 5).

Figure 5:
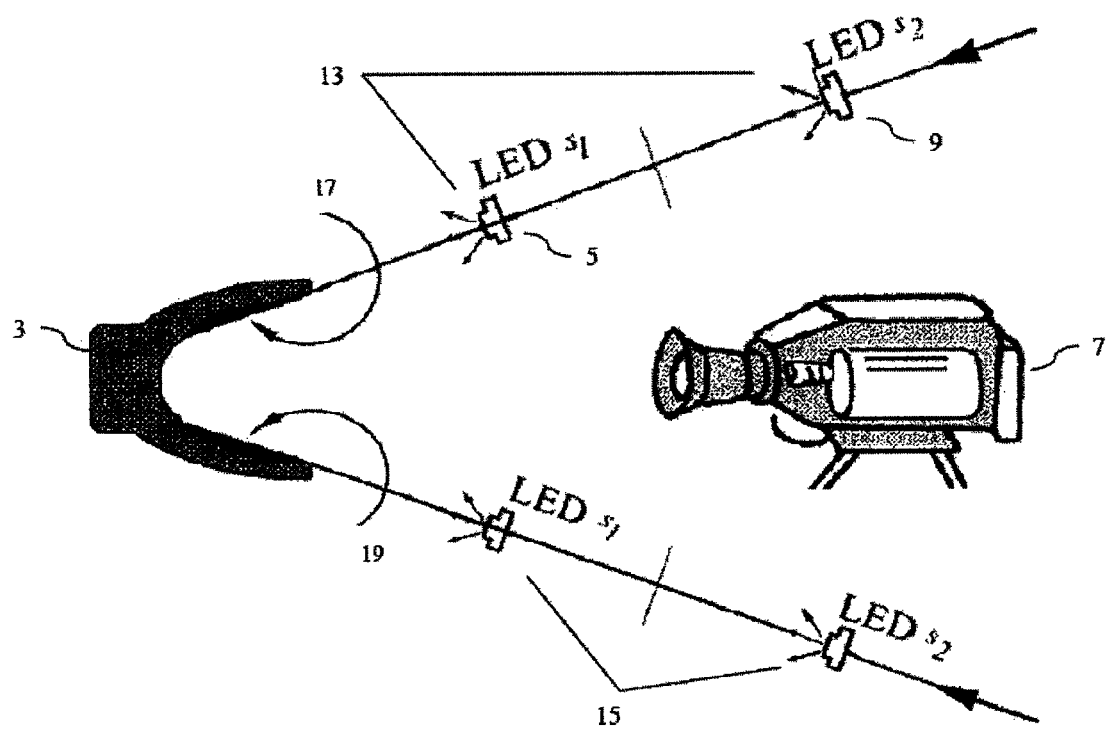
FIG. 5 illustrates the double illuminator sets for eliminating shadows.

FIG. 5 illustrates the double illuminator sets for eliminating shadows. As previously described, if the camera device 7 is positioned too away far from the connecting line between the two point sources of light (first light source 5 LED $s_1$ and second light source 9 LED $s_2$), shadows may be incorporated into the distance map. The shadow is an undesirable image product and may corrupt the accuracy of the distance map. In order to minimize the effect of shadowing, FIG. 5 demonstrates an embodiment of the present invention wherein two sets of LEDs are used (illuminator set 1 13 at a distance of $X_1$ and $X_3$ from the target object and illuminator set 2 15 at a distance of $X_2$ and $X_4$ from the target object) to illuminate the target object 3, in this case an overturned cup. As emphasized by the shape of the overturned cup target object 3, each pair of illuminator sets 13, 15 cast their own specific shadow (see shadow of set 1 17 and shadow of set 2 19). By incorporating two pairs of illuminator sets 13, 15, the pair of shadows 17, 19 can be reduced and the corresponding distance map of the overturned cup target object 3 improved. All of the light sources applied may be of the same type.

FIG. 5 further demonstrates an embodiment of the invention permitting the capture of additional images, corresponding to the additional light sources. By illuminating the one or more target objects using a third light source at a distance $X_3$ from the one or more target objects it is possible to capture an image $I_3$ of the one or more target objects. And by illuminating the one or more target objects using a fourth light source at a distance $X_4$ from the one or more target objects it is possible to capture an image $I_4$ of the one or more target objects. A calculation of the set of distances X'2 between the third and fourth light sources and the one or more target objects based on the decay of intensities of light sources over distances $X_3$ and $X_4$ may be performed using the ratio of the image intensities between the images $I_3$ and $I_4$ on a pixel by pixel basis. At this point it is possible to merge the set of distances developed by the set of distances X'1 between the first and second light sources with the set of distances developed by the second set of distances X'2, thereby minimizing the effect of light source shadowing.

Thus, the final distance map for the overturned cup target object 3 is actually comprised of a merging of the distance map developed by the first illuminator set 13 with the distance map developed by the second illuminator set 15. In the processor 11 of the frame grabber 21, the two derived distance maps are compared on a pixel by pixel basis and an appropriate pixel is selected by comparison. The comparison is made possible due to the fact that the relative position of the camera device 7 and the target object 3 has not been changed as between the two distance maps and a simple merging step common to individuals skilled in the art is sufficient to combine the two distance maps to form a final distance map. This final distance map generally minimizes the effect of shadows on the pixel positioning to provide a more exact result.

Figure 6:
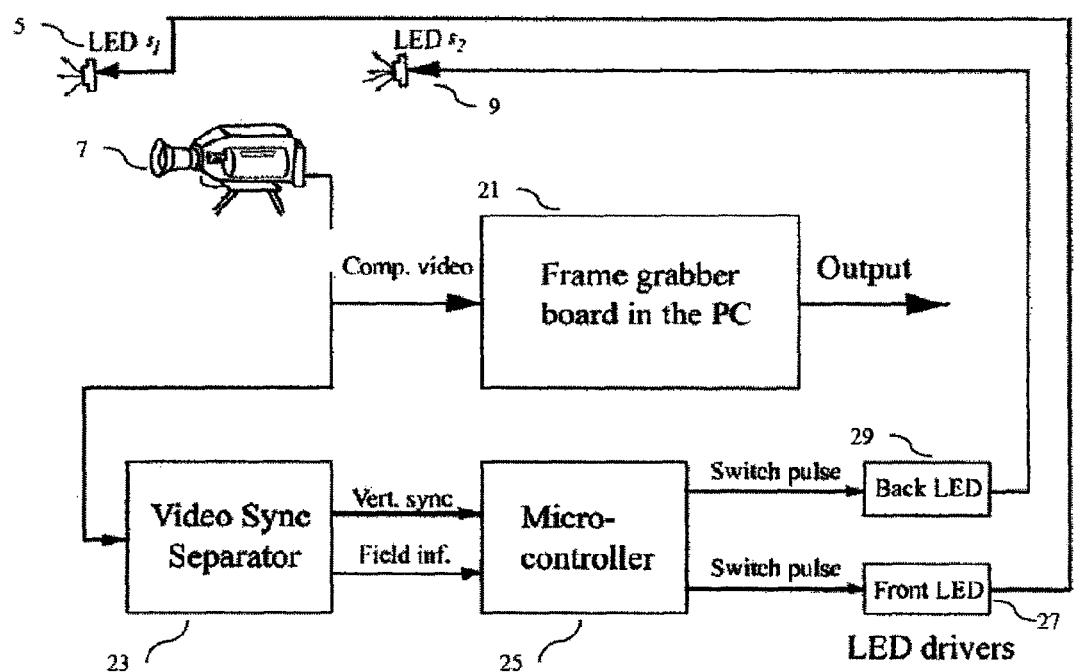
FIG. 6 illustrates a more detailed apparatus for the divergence ratio distance mapping camera.

FIG. 6 illustrates a more detailed apparatus for the divergence ratio distance mapping camera. The more detailed apparatus is comprised of the camera device 7 connected to a computer device including a frame grabber 21 (part of the processing unit 11), also connected to a video sync separator 23 which in turn is connected to a video microcontroller 25 that controls the front 27 and back 29 LED drivers that control the pair of illuminating devices i.e. the front light source 5 LED $s_1$ and back light source 9 LED $s_2$. In addition, the video microcontroller 25 may be connected to a monitor display 31 or some other medium to display the distance map that it calculates.

In one embodiment of the present invention, a distance mapping system is provided including: one or more target objects; at least one camera device and at least two light sources. The at least one computer device is linked to the camera that is operable to capture digital frame information, and calculate distance X between the center of the light sources and one or more target objects based on the method of the present invention.

In the preferred embodiment of the present invention, the composite video signal out of an infra red camera device 7 was used to synchronize the timing of the front and back infra red illuminating devices 5, 9. The composite video signal is fed into a video sync separator 23 that extracts the vertical sync pulse and also provides the odd/even field information. This output from the sync is provided to the video microcontroller 25.

Figure 7A:
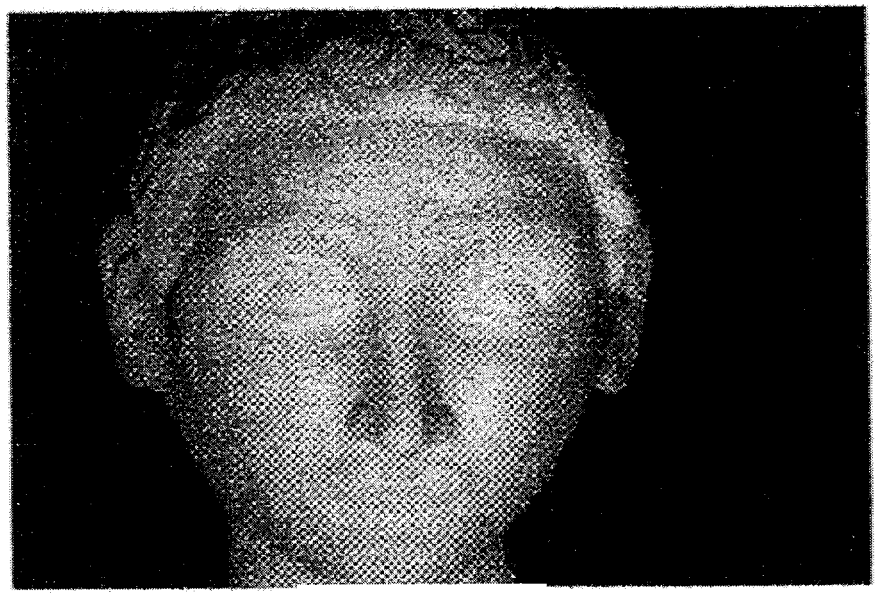
FIG. 7a image taken with front illumination.

The video microcontroller 25 is operable to signal the front LED 5 to illuminate when the camera device 7 is in the even field and an image $I_1$ is captured and stored in the frame grabber 21 (see FIG. 7a). The video microcontroller 25 is operable to signal the back LED 9 to illuminate when the camera device 7 is in the odd field and an image $I_2$ is captured and stored in the frame grabber 21 (see FIG. 7b). In this manner the video microcontroller is operable to signal the first light source and the second light source to illuminate the one or more target objects in a sequential manner. Additionally, the video microcontroller and the camera device are linked to enable the camera device to capture the images of the one or more target objects sequentially, while illuminated by the first and second light sources in sequence. The frame grabber 21 then applies the derived distance Eq. (7) to the two images $I_1$ and $I_2$ on a pixel by pixel basis and the distance map of the target object 3 can be displayed on a monitor display (31) (see FIG. 7d).

In one embodiment, the depth of an image or the distance map can be displayed using a colour code with red being the shortest distance and purple being the longest distance. This same information can be displayed using black and white wherein dark represents the shortest distance and white represents the longest distance.

FIG. 7a illustrates an image taken with front illumination. This is an image of a face of a statue taken by an IR camera device 7 only using front illumination 5 and stored in the frame grabber 21.

Figure 7B:
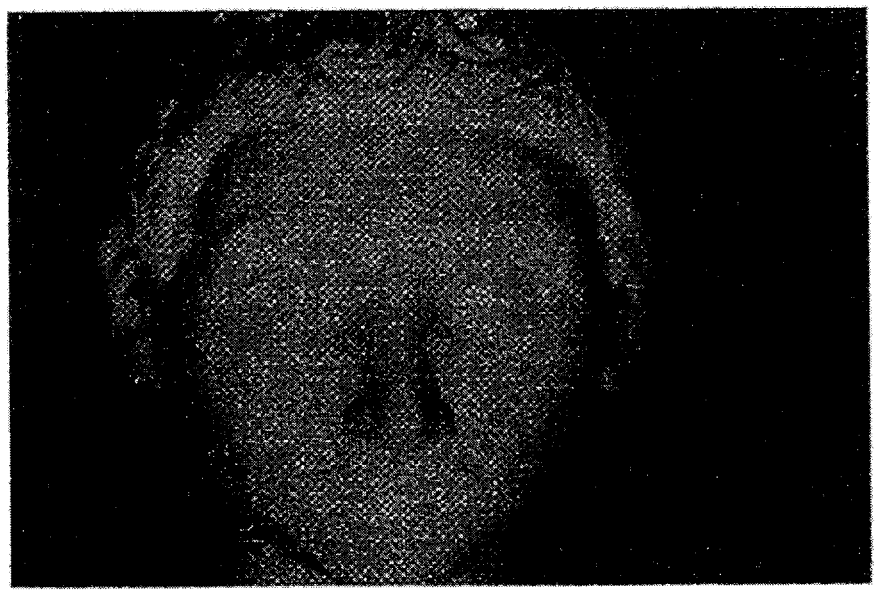
FIG. 7b image taken with back illumination.

FIG. 7b illustrates an image taken with back illumination. This is an image of a face of a statue taken by an IR camera device 7 only using back illumination 9 and stored in the frame grabber 21.

Figure 7C:
FIG. 7c photograph of the object

FIG. 7c illustrates a photograph of the object. This is a normal photograph of the face of the statue for comparison with the generated depth profile (see FIG. 7d).

Figure 7D:
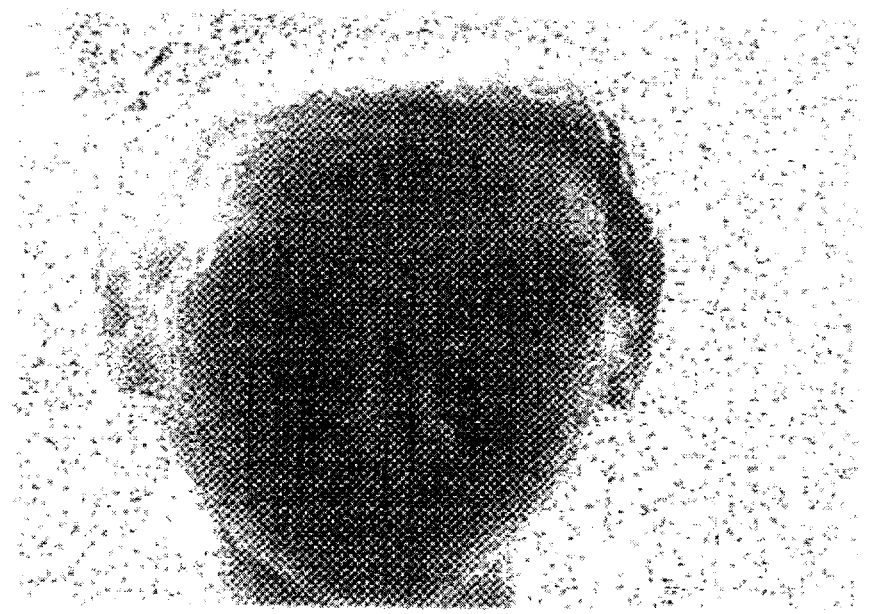
FIG. 7d measured depth profile of the object.

FIG. 7d illustrates a measured depth profile of the object. This is the result of the frame grabber applying the distance Eq. (7) on the image taken in FIG. 7a and the image taken in FIG. 7b on a pixel by pixel basis. As previously explained, dark represents the shortest distance between the target object 3 and the midpoint between the front 5 and back 9 LED devices while white depicts longer distances between the target object 3 and the midpoint between the front 5 and back 9 LED devices.

It should be noted that there exist practical limits on the range of the camera of the present invention. The measurement depends upon the divergence of light. This limit may be extended by unbalancing the intensities of these two illuminating light sources by avoiding the saturation of the CCD camera device 7 when the front LED 5 is too close to the target object 3. In particular when the distance z to the target object 3, is large as compared to the LED separation distance 2d, the light intensities $Int_A$, and $Int_B$ are more or less the same but as the distance to the target object 3 become excessively short and the front light 5 intensity $Int_A$ becomes much larger than $Int_B$, this difference between the light intensities no longer remains within the linear range of the CCD camera device 7. As mentioned this limit may be extended by either reducing the exposure time of the CCD camera device 7 when capturing the image with the front LED or by reducing the output power of only the front LED 5 by a known factor N and keeping $Int_B$ unchanged. An appropriate value for N may be found by monitoring the composite video signal of the CCD camera device 7.

In a particular aspect of the invention, the distance mapping system is operable to provide the three-dimensional information and be incorporated, for example, into the automobile industry. The system may be integrated with an automobile distance mapping system or accident prevention system. The distance mapping apparatus of the present invention could be incorporated to quickly provide for the exact 3D pixel positional information for prototype vehicles. The distance mapping device provides for real time operational advantages. Most other methods need time for setting up the sensors at specified locations even before making a measurement. The distance mapping apparatus is a hand-held operation that can aim at target at any angle and location relative to the object. Additional embodiments of the invention may be further incorporated into aspects of the automobile industry.

In another particular aspect of the invention, the distance mapping system is linked to an on-board computer system of a vehicle and is operable to provide environmental 3D information to assist the on-board system of the vehicle in accident prevention. The distance mapping system can differentiate the radar echo from the trees on the pavement from that of an oncoming moving car from the shape of the objects. Generally, ordinary radar systems do not function in this manner. For example, when a car equipped with an ordinary radar system negotiates the curve of a road the ordinary radar system may mistake trees along the side of the road as an oncoming car and the automatic braking system would be triggered. In other words, an ordinary radar system functions optimally when the equipped car is travelling along a straight road but not along a curved road.

In another aspect of the invention, the distance mapping system could be incorporated into traffic surveillance system and is operable to obtain three-dimensional information associated with automobiles, such three-dimensional information providing a basis for establishing make and model information for automobiles. For example, in this manner the present invention may be used to assist in determining the make and model of a vehicle by only calculating the distance map of one profile. The detailed information of the one profile of the vehicle could be extrapolated to recreate a 3D representation of the vehicle, or it could be used to compare with stored library information of 3D representations of vehicles for greater accuracy and identification.

In another particular aspect of the invention, a distance mapping system is provided as previously described wherein the distance mapping system is operable to provide distance information relative to one or more target objects to an individual with a visual impairment regarding their physical environment. For example, environmental three-dimensional information may be provided so as to assist an individual who is visually impaired. Due to the ability to freely position the camera device 7, the distance mapping system could be readily incorporated into an assistive cane or incorporated into the outer apparel of a visually impaired individual. The distance mapping system could then provide signals regarding the calculated environmental information to the individual based upon predefined criteria such as the size and the shape of an object. Ordinary echo based warning systems are not capable of discerning whether an object is a man, a tree, or a building. In addition, the distance mapping system could be readily incorporated into a humanoid robotic system to provide omni directional eye vision to more quickly identify its surroundings and avoid obstacles. Alternatively, the system of the present invention may be integrated with any type of robot to provide distance mapping information to the robot in relation to one or more target objects.

In yet another particular aspect of the invention, the distance mapping system is operable to provide environmental 3D information for a 3D virtual studio. Due to the ability to freely position the camera device 7, a 3D virtual studio could be readily set up wherein the live scenery is inserted either in the foreground or background of a computer generated graphic, but could be positioned anywhere within the frame as long as the computer generated graphics itself as the distance information in each pixel. In addition, the 3D virtual studio could function in real time and could greatly assist television broadcasts. For this purpose the system of the present invention may be integrated with a television studio system to provide three-dimensional information that enables editing of one or more target objects in a three-dimensional studio environment. All too often live reporters are disrupted by individuals walking into the video frame; these individuals could be removed in real time by distance discrimination. The real time editing need not be limited to the removal of individuals, once the 3D information has been obtained for a video frame, virtually anything may be edited into and out of the video feed.

In a still other aspect of the present invention, the distance mapping system is incorporated into the cosmetic industry to quickly provide a 3D imaging of a patient without having to manufacture a moulding. More specifically, this 3D imaging could be used to assist a plastic surgeon and subsequently the patient in determining how certain features may appear after a procedure. In addition, the 3D imaging information could be used by an orthodontist who makes teeth mouldings, the provided information could greatly reduce the need of an uncomfortable moulding process. The current distance mapping system would allow for a 3D image to be made without any contact with the patient and a non-invasive manner.

In another aspect of the present invention, the distance mapping system may be readily incorporated into a security system and more specifically linked to a fingerprint capture system, wherein the distance mapping system is accomplished in a touch-less non contact method that provides a three-dimensional creation of a 3D map of a fingerprint without having to ink the individual's fingers or touch a panel for scanning of the palm. In another security implementation of the present invention, the distance mapping system may be readily incorporated into surveillance systems to provide for profile information on an individual. If a front profile of an individual has been captured, the distance mapping system could be used to generate a side profile of the individual. Additionally, if the side profile of an individual has been captured, the front profile could be extrapolated based upon the 3D distance mapping information.

In yet another aspect of the present invention, the system may be integrated with a biometric authentication system to enable bio-authentication of individuals based on touch-less capture of bio-authentication information such as fingerprints.

In another aspect of the present invention, a distance mapping system is provided wherein the distance mapping apparatus may substitute or replace the illuminating light sources with sound transducers to achieve a sonar distance mapping camera for underwater objects like a submarine or a school of fish result.

In yet another embodiment of the present invention, a distance mapping system is provided wherein for the purposes of real time 3D information gathering, the sources are of the same type (i.e. acoustic sources or light sources).

What is claimed is:

1. A method of obtaining three-dimensional information for one or more target objects is provided comprising:
   (a) selecting one or more target objects;
   (b) illuminating the one or more target objects using a first illuminating device at a distance $X_1$ from the one or more target objects, and capturing an image $I_1$ of the one or more target objects using at least one camera device;
   (c) illuminating the one or more target objects using a second illuminating device at a distance $X_2$ from the one or more target objects, and capturing an image $I_2$ of the one or more target objects using the at least one camera device; and
   (d) calculating the set of distances X'1 between the first and second illuminating devices, and the one or more target objects, based on the decay of intensities of the first and second illuminating devices over distances $X_1$ and $X_2$, using the ratio of the image intensities between the images $I_1$ and $I_2$,
   (e) illuminating the one or more target objects using a third illuminating device at a distance $X_3$ from the one or more target objects and capturing an image $I_3$ of the one or more target objects;
   (f) illuminating the one or more target objects using a fourth illuminating device at a distance $X_4$ from the one or more target objects and capturing an image $I_4$ of the one or more target objects;
   (g) calculating the set of distances X'2 between the third and fourth illuminating devices and the one or more target objects based on the decay of intensities of illuminating devices over distances $X_3$ and $X_4$ using the ratio of the image intensities between the images $I_3$ and $I_4$;
   (h) merging the set of distances developed by the set of distances X'1 between the first and second illuminating devices with the set of distances developed by the second set of distances X'2, thereby minimizing the effect of illuminating device shadowing; and
   wherein the decay of the illumination intensity over distance X is $1/x^n$, where n can be any positive or negative real number including a non-integer.

2. The method for obtaining three-dimensional information for one or more target objects as defined in claim 1, wherein the distance X between the two illuminating devices the one or more target objects is calculated based on the distance between the midpoint of the two illuminating devices and the one or more target objects.

3. The method for obtaining three-dimensional information for one or more target objects as defined in claim 1, wherein:
   (a) the first image $I_1$ and the second image $I_2$ are stored on a known storage medium;
   (b) the distance between the one or more target objects and the midpoint between the two illuminating devices is calculated by analyzing images $I_1$ and $I_2$ on a pixel by pixel basis; and
   (c) the calculated pixel distance information is stored using a known coordinate storage medium.

4. The method for obtaining three-dimensional information for one or more target objects as defined in claim 1, comprising the further step of illuminating the one or more target objects with additional illuminating device for reduction of the impact of shadow on the measurement of illumination intensity.

5. A system for obtaining three-dimensional information for one or more target objects comprising:
   (a) at least two illuminating devices, including a first illuminating device at a distance $X_1$ from one or more target objects, and a second illuminating device at a distance $X_2$ from the one or more target objects; and
   (b) at least one camera device linked to, or incorporating, at least one computer device, the camera device, or the camera device and computer device together, being operable to:
   (i) capture and store digital frame information, including capturing an image $I_1$ of the one or more target objects, illuminated by the first illuminating device, and an image $I_2$ of the same one or more target objects, illuminated by the second illuminating device;
   (ii) calculate the set of distances X'1 between the at least two illuminating devices and the one or more target objects based on the ratio of the decay of image intensities of illuminating devices over distances $X_1$ and $X_2$ using the ratio of the image intensities between the images $I_1$ and $I_2$;
   (iii) capture an image $I_3$ of the one or more target objects using a third illuminating device at a distance $X_3$ from the one or more target objects;
   (iv) capture an image $I_4$ of the one or more target objects using a fourth illuminating device at a distance $X_4$ from the one or more target objects and capturing;
   (v) calculate a set of distances X'2 between the third and fourth illuminating devices and the one or more target object based on the decay of intensities of illuminating devices over distances $X_3$ and $X_4$ using the ratio of the image intensities between the images $I_3$ and $I_4$;
   (vi) merge the set of distances X'1 between the first and second illuminating devices with the set of distances developed by the set of distances X'2, thereby minimizing the effect of illuminating device shadowing; and
   wherein the decay of the illumination intensity over distance X is $1/x^n$, where n can be any positive or negative real number including a non-integer.

6. The system for obtaining three-dimensional information for one or more target objects as defined in claim 5, wherein the illuminating devices are of the same type.

7. The system for obtaining three-dimensional information for one or more target objects as defined in claim 5, wherein to minimize the effect of illuminating device shadowing the system further comprises:

(a) an additional set of illuminating devices of the same type.

8. The system for obtaining three-dimensional information for one or more target objects as defined in claim 5, wherein the distance X between the first and second two illuminating devices and the one or more target objects is calculated based on the distance between the one or more target objects and the midpoint of the first and second illuminating devices.

9. The system for obtaining three-dimensional information for one or more target objects as defined in claim 5, wherein the system is linked to a storage medium, and characterized in that the computer device is operable to:
   (a) store the first image $I_1$ and the second image $I_2$ to the storage medium;
   (b) calculate the distance between the one or more target objects and the two light illuminating devices by analyzing images and $I_2$ on a pixel by pixel basis; and
   (c) store the calculated pixel distance information to the storage medium.

10. The system for obtaining three-dimensional information for one or more target objects as defined in claim 9, wherein the system is operable to generate a distance map for the one or more target objects based on the calculated pixel distance information.

11. The system for obtaining three-dimensional information for one or more target objects as defined in claim 5, wherein the camera device is linked to at least one video microcontroller for controlling the illuminating devices.

12. The system for obtaining three-dimensional information for one or more target objects as defined in claim 5, wherein the video microcontroller is linked to the illuminating devices, and is operable to signal the first illuminating device and the second illuminating device to illuminate the one or more target objects in a sequential manner.

13. The system for obtaining three-dimensional information for one or more target objects as defined in claim 11, wherein the video microcontroller and the camera device are linked to enable the camera device to capture the images of the one or more target objects sequentially, while illuminated by the first and second illuminating devices in sequence.

14. The system for obtaining three-dimensional information of one or more target objects as defined in claim 5, wherein the system is adapted to calculate distance by replacing the two illuminating devices with two sound transducers.

15. The system for obtaining three-dimensional information of one or more target objects as defined in claim 5, wherein the system is integrated with an automobile distance mapping system or accident prevention system.

16. The system for obtaining three-dimensional information of one or more target objects as defined in claim 5, wherein the system is integrated with a robot to provide distance mapping information to the robot in relation to one or more target objects.

17. The system for obtaining three-dimensional information of one or more target objects as defined in claim 5, wherein the system is integrated with a traffic surveillance system and is operable to obtain three-dimensional information associated with automobiles, such three-dimensional information providing a basis for establishing make and model information for automobiles.

18. The system for obtaining three-dimensional information of one or more target objects as defined in claim 5, wherein the system is integrated with a distance mapping system that is operable to provide distance information relative to one or more target objects to an individual with a visual impairment regarding their physical environment.

19. The system for obtaining three-dimensional information of one or more target objects as defined in claim 5, wherein the system is integrated with a television studio system to provide three-dimensional information that enables editing of one or more target objects in a three-dimensional studio environment.

20. The system for obtaining three-dimensional information of one or more target objects as defined in claim 5, wherein the system is integrated with a biometric authentication system to enable bio-authentication of individuals based on touch-less capture of bio-authentication information, including fingerprints.

21. The system for obtaining three-dimensional information of one or more target objects as defined in claim 5, wherein the system is moveable to an arbitrary location.

\* \* \* \* \*